United States Patent

Mukai et al.

[11] Patent Number: 5,995,286
[45] Date of Patent: Nov. 30, 1999

[54] DIFFRACTIVE OPTICAL ELEMENT, AN OPTICAL SYSTEM HAVING A DIFFRACTIVE OPTICAL ELEMENT, AND A METHOD FOR MANUFACTURING A DIFFRACTIVE OPTICAL ELEMENT

[75] Inventors: Hiromu Mukai, Kawachinagano; Yuichiro Ori, Moriyama; Shigeto Ohmori, Kawachinagano, all of Japan

[73] Assignee: Minolta Co., Ltd., Osaka, Japan

[21] Appl. No.: 09/035,436

[22] Filed: Mar. 5, 1998

[30] Foreign Application Priority Data

Mar. 7, 1997 [JP] Japan ................................ 9-052962
Mar. 27, 1997 [JP] Japan ................................ 9-075660

[51] Int. Cl.$^6$ ........................ G02B 5/18; G02B 3/08; G11B 7/00
[52] U.S. Cl. .................... 359/571; 359/575; 359/742; 369/109
[58] Field of Search ................... 359/565, 566, 359/569, 571, 575, 742; 369/109, 44.23, 112

[56] References Cited

U.S. PATENT DOCUMENTS 5,054,905 10/1991 Cohen ........................................ 359/571
5,543,966 8/1996 Meyers ...................................... 359/565
5,737,125 4/1998 Ohashi ...................................... 359/575

FOREIGN PATENT DOCUMENTS 0412751 8/1990 European Pat. Off. .
5-150108 6/1993 Japan .
7-50206 5/1995 Japan .
8-508116 8/1996 Japan .

*Primary Examiner*—Georgia Epps
*Assistant Examiner*—Evelyn A. Lester
*Attorney, Agent, or Firm*—Sidley & Austin

[57] ABSTRACT

An optical system has a diffractive optical element. A diffractive optical surface of the optical element has a blaze-shaped diffraction grating. The grating heights are smaller in the peripheral region of the grating than in the central region of the grating around its optical axis. The optical element acts as a lenses a result of light rays being deflected by the light-diffracting action of the diffractive optical surface.

26 Claims, 8 Drawing Sheets

DIFFRACTIVE OPTICAL ELEMENT, AN OPTICAL SYSTEM HAVING A DIFFRACTIVE OPTICAL ELEMENT, AND A METHOD FOR MANUFACTURING A DIFFRACTIVE OPTICAL ELEMENT

This application is based on applications Nos. H9-052962 and H9-075660 filed in Japan, the content of which is hereby incorporated by reference.

BACKGROUND OF THE INVENTION

1. Field of the Invention

The present invention relates to an optical element that has light-diffracting properties, to an optical system having such an optical element, and to a method for manufacturing such an optical element. More particularly, the present invention relates to all optical element having a blaze-shaped diffraction grating (i.e., a diffraction grating that has a serrated cross section composed of a series of rectangular triangles), to an optical system having such an optical element, and to a method for manufacturing such an optical element.

2. Description of the Prior Art

In recent years, various techniques have been proposed for correcting chromatic aberration with as few lens elements as possible through the light-dispersing action of a lens surface that has light-diffracting properties.

For example, the taking lens of a single-lens camera employs resin-molded lens elements that help minimize chromatic aberration, and, as one preferable example of such resin-molded lenses, Japanese Patent Publication No. H8-508116 proposes a diffractive optical element that adopts a light-diffracting construction to correct chromatic aberration.

This prior-art lens is a refraction/diffraction-hybrid-type achromatic lens (i.e., a lens that is made achromatic through the action of both refraction and diffraction) made of transparent resin, and is suitable for a single-lens camera that operates in the visible-light region. More specifically, at least one of the optically relevant surfaces of this lens is not only curved to form a refractive region having a refractive power but also provided with a diffractive region having a diffractive power to reduce the chromatic aberration caused by the refractive region.

In a diffractive optical element, as described above, that acts as a lens through the action of a diffraction grating, it is essential that the element have a stronger diffractive power in its peripheral region, than in its central region such regions being with respect to and around the optical axis of the optical element. To make the diffractive power in the peripheral region stronger, the pitch of the grating in that region needs to be made finer. Inconveniently, however, a fine-pitched diffraction grating is difficult to produce. European Patent No. 0412751 proposes a diffractive optical element in which a relatively strong diffractive power is achieved not by making the grating pitch finer but by designing a grating of a higher order. In this diffractive optical element, to obtain a grating of a higher order, the diffraction grating is designed to have larger grating heights in its peripheral region than in its central region, such regions being with respect to and around the optical axis of the optical element.

Inconveniently, however, the diffraction grating proposed in this European Patent No. 0412751 exhibits poor diffraction efficiency in its peripheral region and causes eclipse in that region.

To cope with these problems, Japanese Published Patent Application No. H7-50206 proposes a grating that is so shaped as to selectively produce diffracted light of the orders 0 (zero) and ±1 (the shape is defined in terms of the bi-level heights of the grating, the inclination of the surfaces forming the convex regions of the grating, and the difference in the refractive index between the convex and concave regions); on the other hand, Japanese Laid-open Patent Application No. H5-150108 proposes a grating that is so shaped as to offer desired phase-shift characteristics. However, these gratings are not so shaped as to act as lenses, and therefore the use of such grating shapes in a diffractive optical element does not help prevent reduction in the diffraction efficiency or eclipse as mentioned above.

When a diffractive optical element is manufactured through resin molding by the use of a mold, a blaze-shaped pattern formed on the surface of the mold is transferred onto resin material. At that time, the finer the pitch of the diffraction grating, the less negligible the transfer errors that occur during the transferring process, particularly in the peripheral region. Inconveniently, this adds to the difficulty of producing a fine-pitched diffraction grating.

SUMMARY OF THE INVENTION

A first object of the present invention is to provide a diffractive optical element that acts as a lens and that exhibits uniform diffraction efficiency in its central and peripheral regions, such regions being with respect to and around its optical axis.

A second object of the present invention is to provide a diffractive optical element that acts as a lens and that does not cause eclipse in its peripheral region, such region being with respect to and around it's optical axis.

A third object of the present invention is to reduce the difficulty involved in the manufacture of a diffractive optical element through resin molding by the use of a mold, and more specifically, to provide a mold for resin-molding a diffractive optical element that helps obtain desired grating heights with high precision in the peripheral as well as central region of the diffractive optical element, such regions being with respect to and around its optical axis.

To achieve the above objects, according to one aspect of the present invention, a diffractive optical element is provided with a diffractive optical surface having a blaze-shaped diffraction grating, said diffraction grating having smaller grating heights in its peripheral region than in its central region, such regions being with respect to and around its optical axis. Here, said diffractive optical element acts as a lens as a result of light rays being deflected by a light-diffracting action of said diffractive optical surface.

According to another aspect of the present invention, a diffractive optical element is provided with a diffractive optical surface having a blaze-shaped diffraction grating composed of light-passing surfaces that pass light rays and wall surfaces that do not act optically, said wall surfaces being formed to be, in a central region with respect to and around an optical axis of said diffraction grating, substantially cylindrical and parallel with respect to the optical axis and, in a peripheral region with respect to and around the optical axis of said diffraction grating, conical with respect to the optical axis. Here, said diffractive optical element acts as a lens as a result of light rays being deflected by light-diffracting action of said diffractive optical surface.

According to another aspect of the present invention, an optical system is provided with a diffractive optical element having a diffractive optical surface provided with a blaze-shaped diffraction grating, said diffraction grating having smaller grating heights in its peripheral region than in its central region, such regions being with respect to and around its optical axis, said diffractive optical element acting as a lens as a result of light rays being deflected by light-diffracting action of said diffractive optical surface.

According to another aspect of the present invention, an optical system is provided with a diffractive optical element having a diffractive optical surface provided with a blaze-shaped diffraction grating composed of light-passing surfaces that pass light rays and wall surfaces that do not act optically, said wall surfaces being formed to be, in a central region of said diffraction grating with respect to and around its optical axis, substantially cylindrical and parallel with respect to the optical axis and, in a peripheral region of said diffraction grating with respect to and around its optical axis, conical with respect to the optical axis, said diffractive optical element acting as a lens as a result of light rays being deflected by a light-diffracting action of said diffractive optical surface.

According to another aspect of the present invention, a method of correcting chromatic aberration in an optical system consists of a first step of producing a diffractive optical element having a blaze-shaped diffraction grating, said diffraction grating having smaller grating heights in its peripheral region than in its central such regions being with respect to and around its optical axis; and a second step of placing said diffractive optical element at such a position within the optical system that is relatively distant from an aperture diaphragm or from a position where principal rays intersect the optical axis.

According to another aspect of the present invention, a method of correcting chromatic aberration in an optical system consists of a first step of producing a diffractive optical element having a blaze-shaped diffraction grating composed of light-passing surfaces that pass light rays and wall surfaces that do not act optically, said wall surfaces being formed to be, in a central region of said diffraction grating and around its optical axis, substantially cylindrical and parallel with respect to the optical axis and, in a peripheral region of said diffraction grating with respect to and around its optical axis, conical with respect to the optical axis; and a second step of placing said diffractive optical element at such a position within the optical system that is relatively distant from an aperture diaphragm or from a position where principal rays intersect the optical axis.

According to another aspect of the present invention, a mold for molding a diffractive optical element that has a diffraction grating consisting of many blaze-shaped grooves and that acts as a lens is provided with a molding surface having smaller grating heights in a region corresponding to a central region around an optical axis of the diffractive optical element to be formed than a corresponding peripheral region around the optical axis of the diffractive optical element.

According to another aspect of the present invention, a method of producing a diffractive optical element consists of a first step of producing a mold whose molding surface has smaller grating heights in a region corresponding to a central region around an optical axis of the diffractive optical element to be formed than a corresponding to a peripheral region around the optical axis of the diffractive optical element; and a second step of producing a diffractive optical element by transferring a pattern formed on the molding surface of said mold onto synthetic-resin material.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
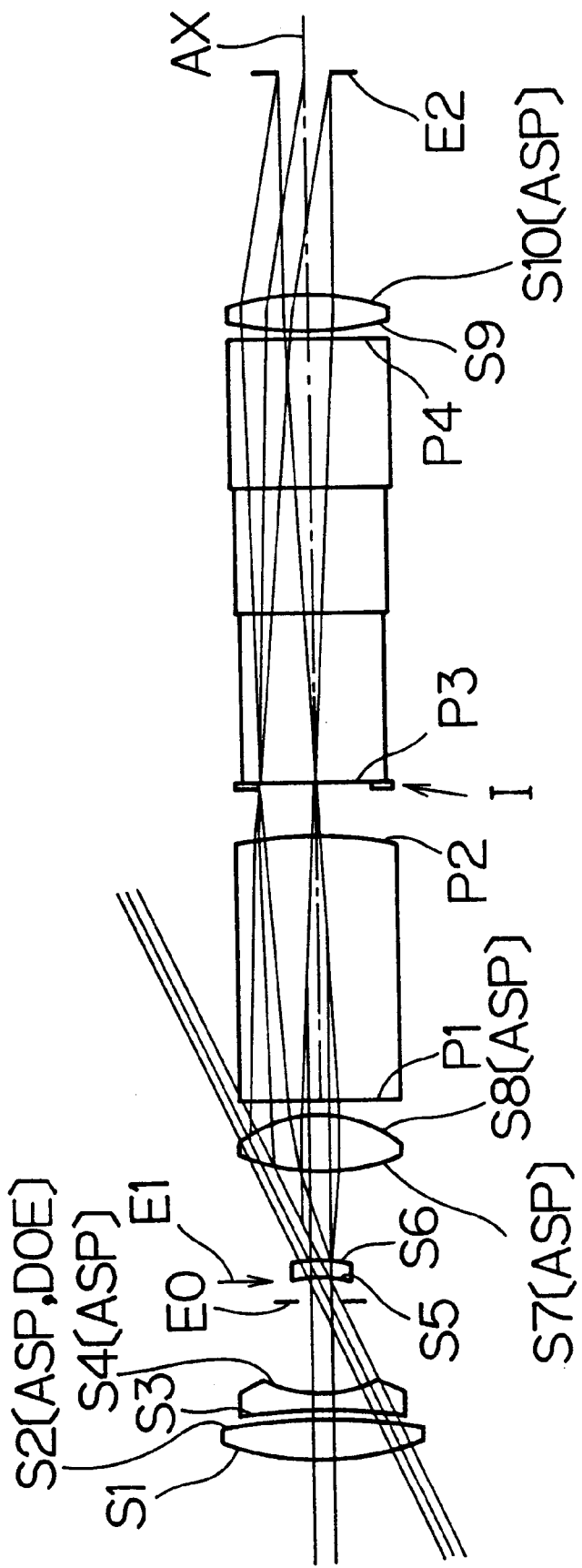
FIG. 1 is a diagram showing the lens arrangement and optical paths of a Kepler-type viewfinder optical system of a first embodiment of the invention.

The Shape of Blazes in a Diffractive Optical Element

In a diffractive optical element, the grating height h of a blaze-shaped diffraction grating is determined as, $$h = m0 \times \lambda 0 / (n0 \times \cos\theta - n'0 \times \cos\theta'), \tag{1}$$

where, m0 represents the design order;

λ0 represents the design wavelength;

n0 represents the refractive index at the design wavelength on the incident side, i.e., that side of the diffractive optical element at which light rays enter;

n'0 represents the refractive index at the design wavelength on the exiting side, i.e., that side of the diffractive optical element at which light rays exit;

θ represents the incident angle, i.e., the angle at which light rays enter the diffractive optical element; and θ' represents the exiting angle, i.e., the angle at which light rays exit from the diffractive optical element.

For light rays that satisfy formula (1) above, the diffraction efficiency is 1 (i.e., 100 percent). In general, the incident angle at various positions on a diffractive optical element spreads uniformly on the positive and negative sides of 0°, and accordingly the incident angle can safely be represented as θ=0°. On the other hand, a diffraction grating has a weak power, and accordingly the exiting angle can safely be represented as θ'≈0°. Thus, in general, the grating height h of a diffraction grating can be expressed as, $$h = m0 \times \lambda 0 / (n0 - n'0). \tag{2}$$

However, when a diffractive optical element is placed at a position in an optical system which is relatively distant from an aperture diaphragm or from the position at which principal rays intersect the optical axis, the incident angle θ at various positions on the diffractive optical element (especially the incident angle of light rays passing through the peripheral region of the diffractive optical element, such region being with respect to and around its optical axis) no longer spreads uniformly on the positive and negative sides of 0°. With this taken into consideration, in order to keep the diffraction efficiency 1 also for light rays that enter the peripheral region of the diffractive optical element at angles, the diffraction grating needs to have lower grating heights in its peripheral region than in its central region.

Table 1 lists the diffraction efficiency calculated for e-line rays entering, at various incident angles θ, a diffraction grating designed for e-line rays entering at an incident angle of θ=0°, together with the diffraction efficiency calculated as the grating height is varied from the design value. Note that, in Table 1, the "grating height ratio" represents the ratio of a particular grating height to the grating height h (assured to be 1) at which the diffraction efficiency is 1 for light rays entering at an incident angle of θ=0°.

As is understood from Table 1, for light rays entering at larger incident angles θ, it is possible to improve the diffraction efficiency by reducing the grating height. In this way, in a diffractive optical element that acts as a lens through the action of a blaze-shaped diffraction grating it has, it is possible to obtain uniform diffraction efficiency in its central and peripheral regions around the optical axis by designing the diffraction grating to have smaller grating heights in the peripheral region than in the central region.

For a blaze-shaped diffraction grating to act as a lens, it needs to have a plurality of pairs of curved surfaces formed from its central region to its peripheral region, each pair of curved surfaces forming a ring around the optical axis and consisting of a blaze-shaped light-passing surface that passes diffracted light rays and a wall surface that does not act as a lens. Of these two curved surfaces that constitute each pair, the one that does not act as a lens (the wall surface) is usually formed as a curved surface including lines that are substantially parallel to the optical axis (i.e., as a substantially cylindrical surface). Since a diffraction grating generally has grating heights h of about 1 μm, light rays are little affected by eclipse caused by these curved surfaces. However, for light rays that enter at angles, the blaze-shaped surfaces cause eclipse. In particular, when the design order is high, or when diffraction occurs at an interface between two kinds of optical material, the diffraction grating has relatively large grating heights h, and accordingly the blaze-shaped surfaces cause large eclipse.

Thus, to minimize eclipse as mentioned above, it is preferable that, in its peripheral region in which light rays enter at angles, the blaze-shaped diffraction grating not contain curved surfaces including lines that are substantially parallel to the optical axis. In other words, the blaze-shaped diffraction grating needs to be so formed as to partly (i.e., as surfaces serving as one of the two curved surfaces constituting each pair as mentioned above) contain, in its central region around the optical axis, curved surfaces including lines that are substantially parallel to the optical axis and, as comparable surfaces in its peripheral region, contain curved surfaces including only such lines that form larger angles with respect to the optical axis than the comparable lines in the central region (with the wall surfaces that do not act as a lens forming part of conical surfaces). In this way, it is possible, even for light rays that enter the peripheral region of the diffractive optical element at angles, to prevent eclipse caused by the blaze-shaped surfaces.

In a diffractive optical element that has a blaze-shaped diffraction grating as described above on its incident side and that has such a power (for example, a positive power) that makes exiting angles larger than incident angles, even light rays that enter at angles are not affected by eclipse caused by blaze-shaped surfaces. On the other hand, in a diffractive optical element that has a blaze-shaped diffraction grating as described above on its exiting side and that has such a power (for example, a negative power) that makes exiting angles smaller than incident angles, even light rays that enter at angles are not affected by eclipse caused by blaze-shaped surfaces.

Numerical Examples of Diffractive Optical Elements and Optical Systems Employing Such Elements Hereinafter, diffractive optical elements embodying the present invention and optical systems employing them will be described in more detail with reference to their construction data, drawings, and other data.

<Embodiments 1 and 2 (FIGS. 1 to 4)>

Figure 3:
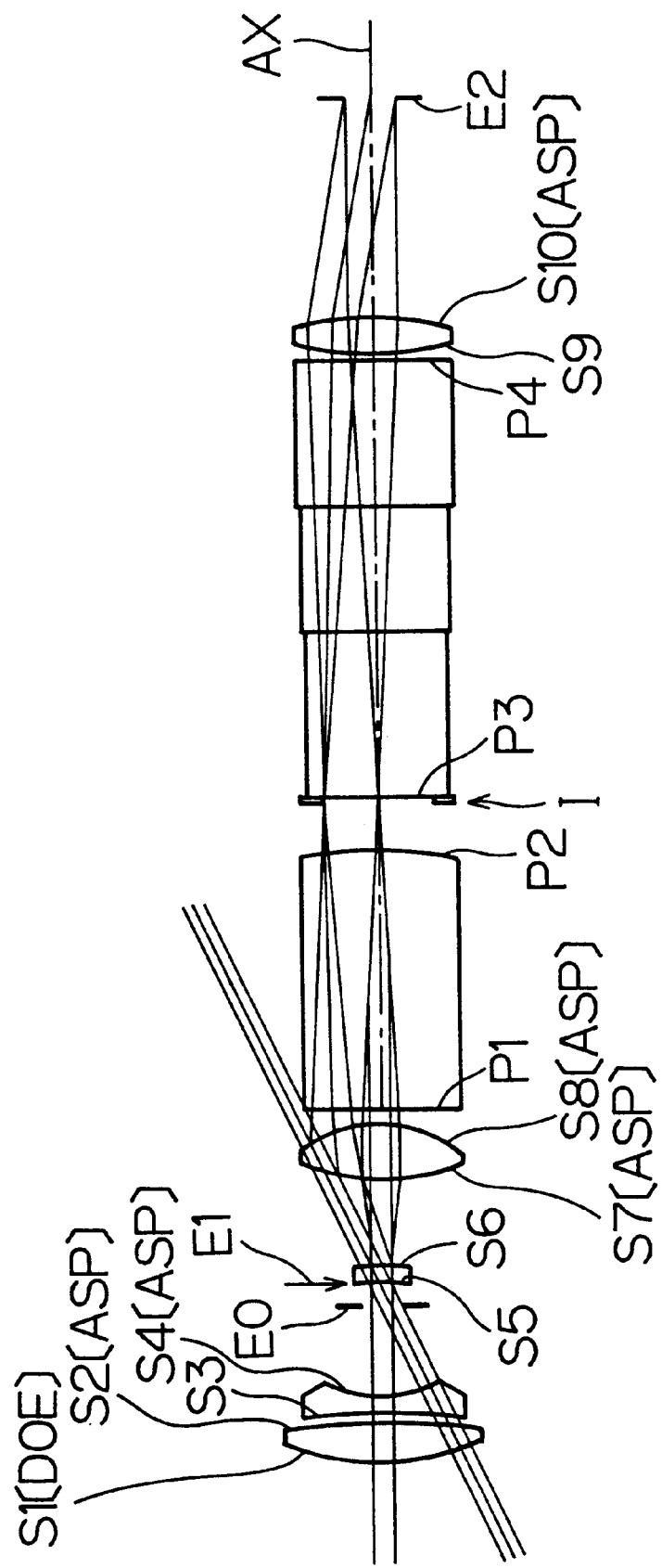
FIG. 3 is a diagram showing the lens arrangement and optical paths of a Kepler-type viewfinder optical system of a second embodiment of the invention.

FIG. 1 shows, as a first embodiment, a Kepler-type viewfinder optical system according to the invention that employs a diffractive optical element according to the invention. FIG. 3 shows, as a second embodiment, another Kepler-type viewfinder optical system according to the invention that employs another diffractive optical element according to the invention. Tables 2 and 4 list the construction data (surface symbols, radii of curvature, axial distances, refractive indices for e-line, and Abbe numbers) of the first and second embodiments, respectively. Tables 3 and 5 list the data related to the aspherical surfaces and the diffractive optical surface in the first and second embodiments, respectively.

In the construction data of each embodiment, Si (i=1, 2, 3, . . . ) represents the ith lens surface from the object side, and Pi (i=1, 2, 3, . . . ) represents the ith prism surface from the object side. A surface Si marked with the symbol [ASP] is an aspherical surface, and its surface shape is defined by formula (AS) below. A surface Si marked with the symbol [DOE] is a diffractive optical surface, and the phase shape of its pitch is defined by formula (DS) below.

$$Z(h) = c \cdot h^2 / \{1 + (1 - \epsilon \cdot c^2 \cdot h^2)^{1/2}\} + \Sigma A \cdot h^i \tag{AS}$$

where,

Z(h) represents the displacement from the reference surface along the optical axis;

h represents the height in a direction perpendicular to the optical axis;

c represents the paraxial curvature;

ε represents the quadric surface parameter; and

Ai represents the aspherical coefficient of the ith order.

$$\phi(h) = (2\pi/\lambda) \cdot (\Sigma C i \cdot h^{2i}) \tag{DS}$$

where,

φ(h) represents the phase function of the diffractive optical surface:

Ci represents the phase function coefficient of the ith order of the diffractive optical surface;

h represents the height in a direction perpendicular to the optical axis (i.e., the grating height); and λ represents the design wavelength (=546 nm).

In both of the first and second embodiments, the Kepler-type viewfinder optical system consists of four, i.e., positive, negative, negative, and positive, objective lenses, an aperture diaphragm (E0) provided between the objective lenses, four inverting prisms, a field-of-view frame provided at the position of the primary image plane (I) between the inverting prisms, and one eyepiece lens. In both embodiments, the lens disposed at the object-side end is a diffractive optical element; in the first embodiment, the image-side surface S2 of the diffractive optical element is a diffractive optical surface [DOE], and, in the second embodiment, the object-side surface S1 of the diffractive optical element is a diffractive optical surface [DOE]. In both embodiments, the most off-axial object height K is -1412.4 mm, the object distance is -3000 mm, the viewfinder magnification is -0.399, and the dioptric power is -1.001.

Figure 2:
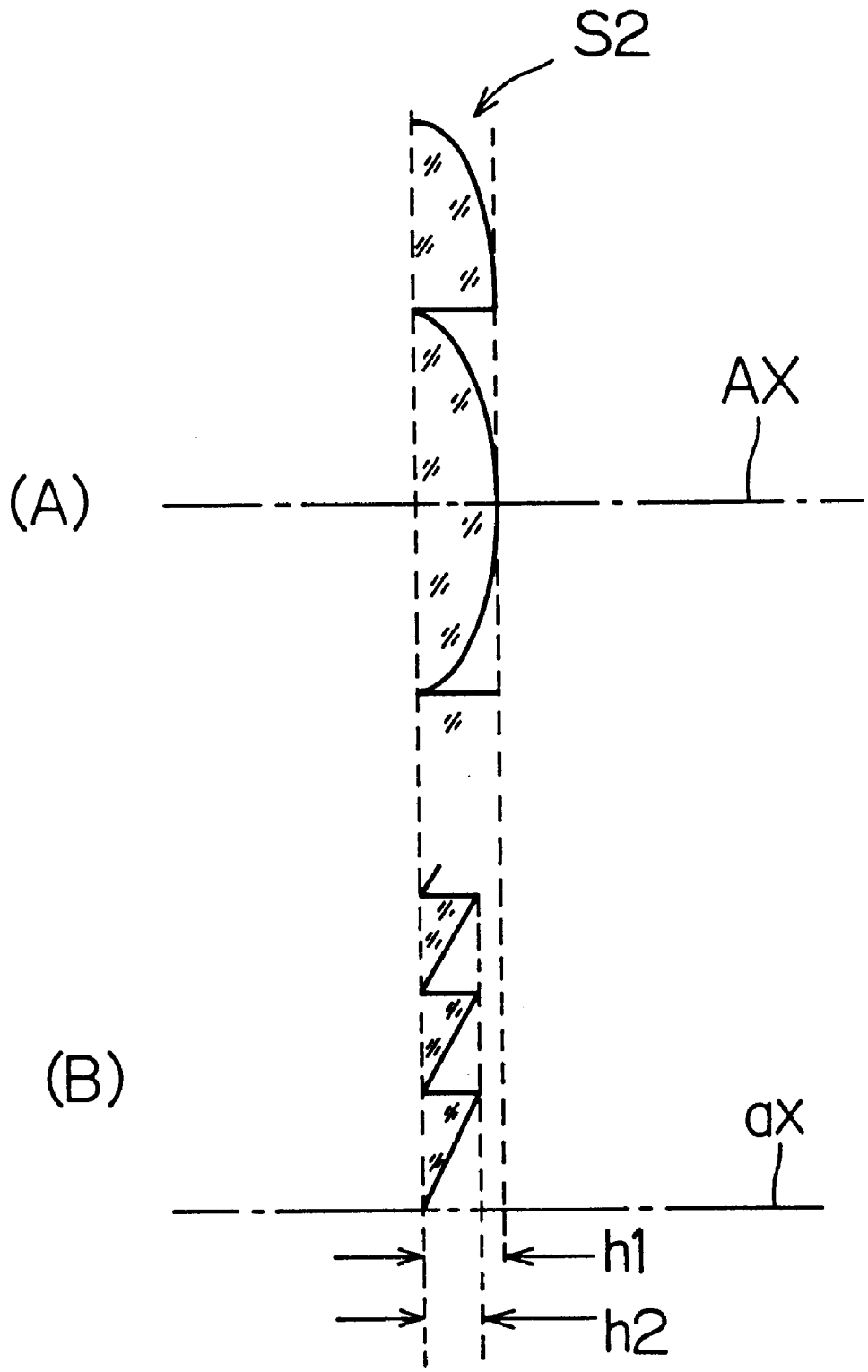
FIG. 2 is a diagram showing enlarged sections of the central and peripheral regions diffractive optical surface used in the first embodiment.

FIG. 2 is a diagram showing the enlarged sections of the diffractive optical surface (S2) of the first embodiment in its central region (A) and in its peripheral region (B). In FIG. 2, the line ax represents a line parallel to the optical axis AX; h1 represents the grating height of the diffraction grating in the central region, and h2 represents the grating height of the diffraction grating in the peripheral region.

In the first embodiment, the diffractive optical surface [DOE] is disposed at the position far from the entrance pupil (E1), and therefore, in the peripheral region around the optical axis, light rays enter at angles. Accordingly, if, as described previously, the grating height h of the diffraction grating is designed in consideration of the incident angles of light rays with respect to the diffractive optical surface, the grating height h2 in the peripheral region will be smaller than the grating height h1 in the central region.

Figure 4:
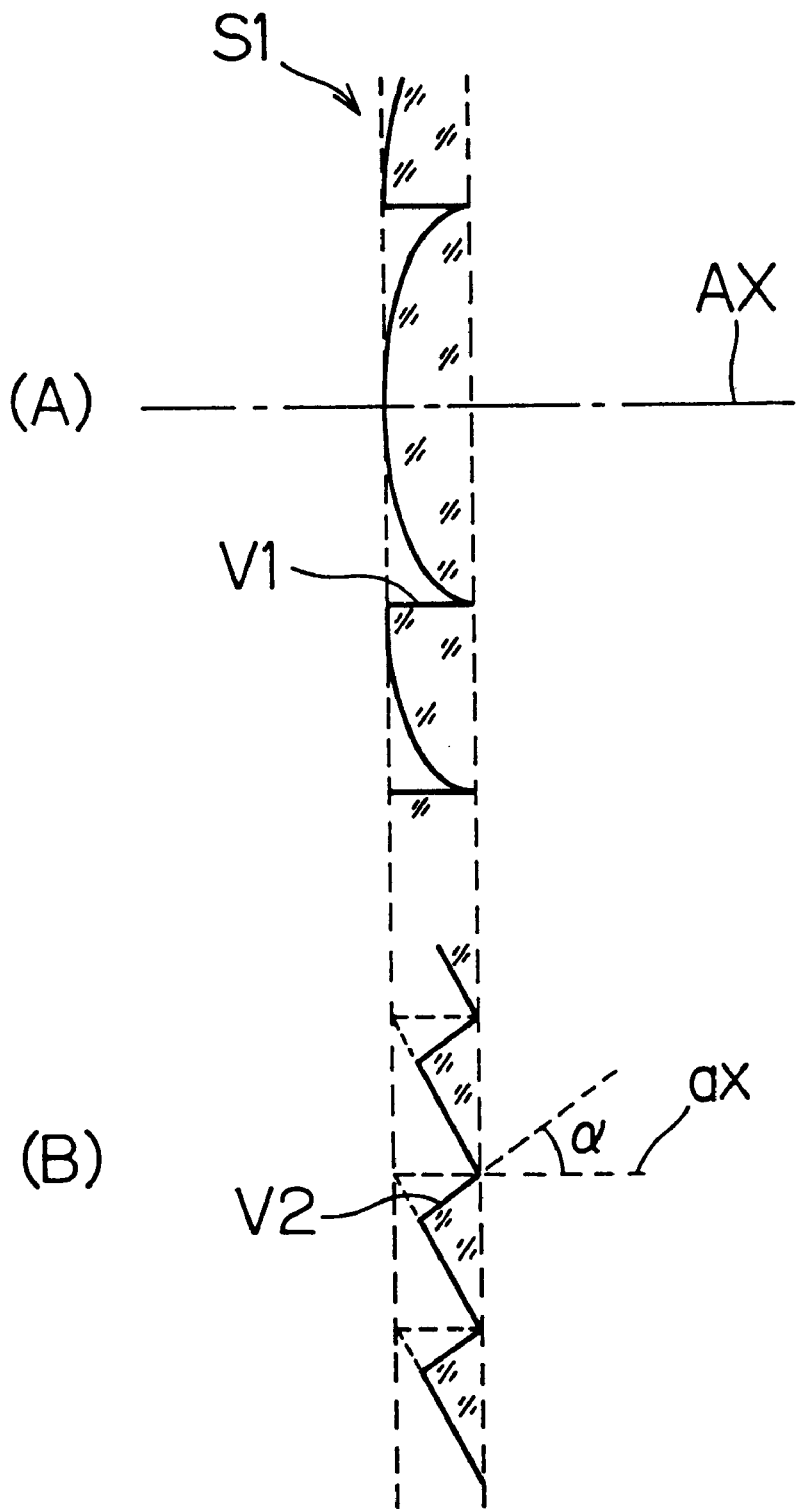
FIG. 4 is a diagram showing enlarged sections of the central and peripheral regions diffractive optical surface used in the second embodiment.

FIG. 4 is a diagram showing the enlarged sections of the diffractive optical surface (S1) of the second embodiment in its central region (A) and in its peripheral region (B). In FIG 4, the line ax represents a line parallel to the optical axis AX. V1, in the central region, represents a curved surface (substantially cylindrical) that includes lines that are substantially parallel to the optical axis AX (like the lines appearing in the section shown at (A) in FIG. 4); V2, in the peripheral region, represents a curved surface (conical) that is comparable to the surface V1. α represents the angle that a line included in the curved surface V2 (like the lines appearing in the section shown at (B) in FIG. 4) forms with respect to the line ax.

In the second embodiment, the diffractive optical surface [DOE] is disposed at the farthest position from the entrance pupil (E1), and therefore, in the peripheral region around the optical axis, light rays enter at angles. Accordingly, if, as described previously, the blaze shape of the diffraction grating is designed in consideration of the incident angles of light rays with respect to the diffractive optical surface, the angle α that a line included in the blaze-shaped curved surface V2 in the peripheral region (like the lines appearing in the section shown at (B) in FIG. 4) forms with respect to the optical axis AX will be greater than the same angle that a line included in the curved surface V1 (like the lines appearing in the section shown at (A) in FIG. 4) forms.

<Embodiment 3 (FIG. 5)>

Figure 5:
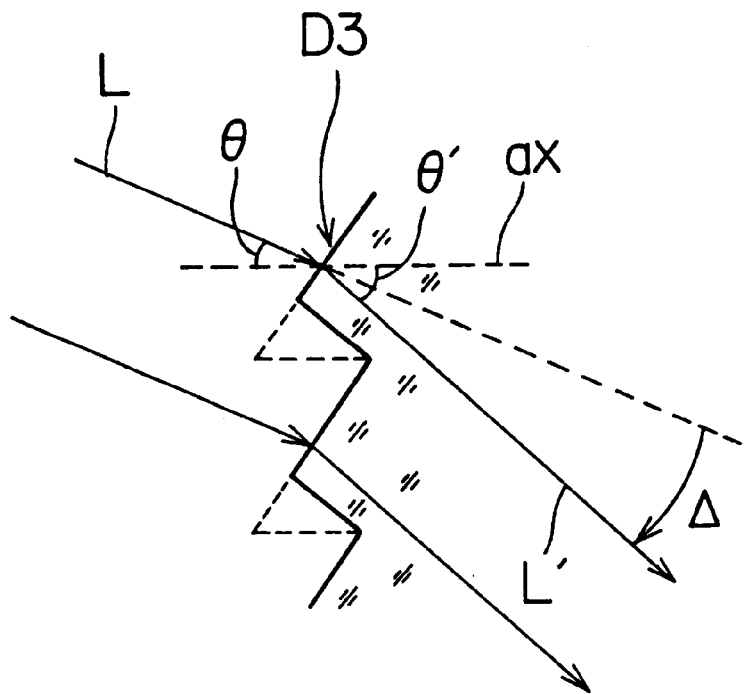
FIG. 5 is a diagram showing an enlarged section of the peripheral region diffractive optical surface used in a third embodiment.

FIG. 5 is a diagram showing an enlarged section of the peripheral diffractive optical surface used in a third embodiment. In FIG. 5, ax represents a line parallel to the optical axis AX, (not shown) L represents light rays incident on the diffractive optical surface D3, L' represents light rays exiting from the diffractive optical surface D3, θ represents the incident angle, θ' represents the exiting angle, and Δ represents the difference between θ and θ'. In the third embodiment, the diffractive optical surface D3 is disposed on the incident side of the lens, and is designed to have a positive power so that the exiting angle θ' will be greater than the incident angle θ.

<Embodiment 4 (FIG. 6)>

Figure 6:
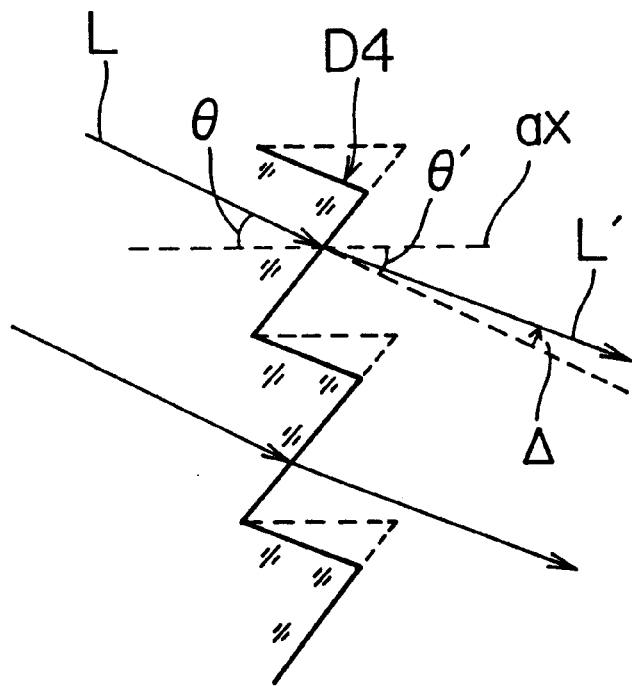
FIG. 6 is a diagram showing the an enlarged section of the peripheral region of the diffractive optical surface used in a fourth embodiment.

FIG. 6 is a diagram showing an enlarged section of the peripheral region diffractive optical surface used in a fourth embodiment. In FIG. 6, ax represents a line parallel to the optical axis AX (not shown) L represents light rays incident on the diffractive optical surface D4, L' represents light rays exiting from the diffractive optical surface D4, θ represents the incident angle, θ' represents the exiting angle, and Δ represents the difference between θ and θ'. In the fourth embodiment, the diffractive optical surface D4 is disposed on the exiting side of the lens, and is designed to have a negative power so that the exiting angle θ will be smaller than the incident angle θ.

Production Examples of Diffractive Optical Elements

As described previously, in a diffractive optical element, the grating height h of a blaze-shaped diffraction grating is determined by formulae (1) and (2), which are noted below again:

$$h = m0 \times \lambda 0 / (n0 \times \cos\theta - n'0 \times \cos\theta'), \quad (1)$$

$$h = m0 \times \lambda 0 / (n0 - n'0), \quad (2)$$

where, m0 represents the design order;

λ0 represents the design wavelength;

n0 represents the refractive index at the design wavelength on the incident side, i.e., that side of the diffractive optical element at which light rays enter;

n'0 represents the refractive index at the design wavelength on the exiting side, i.e., that side of the diffractive optical element at which light rays exit;

θ represents the incident angle, i.e., the angle at which light rays enter the diffractive optical element; and θ' represents the exiting angle, i.e., the angle at which light rays exit from the diffractive optical element.

When a blaze-shaped diffraction grating is manufactured through resin molding of resin material by use of a mold, a blaze-shaped pattern formed on the mold needs to be transferred to the resin material. In this process, transfer errors are inevitable. The degree of a transfer error is often represented as a fill factor; for example, when no transfer error occurs, the fill factor is said to be 100%, and a lower fill factor indicates an accordingly large transfer error.

The transfer error results from the frictional force that occurs at the interface between the resin material and the mold, and therefore it increases in proportion to the ratio of the area over which the resin is brought into contact with the mold to the volume of the resin. This will be explained in more detail with reference to the model patterns shown in FIG. 7.

Figure 7A:
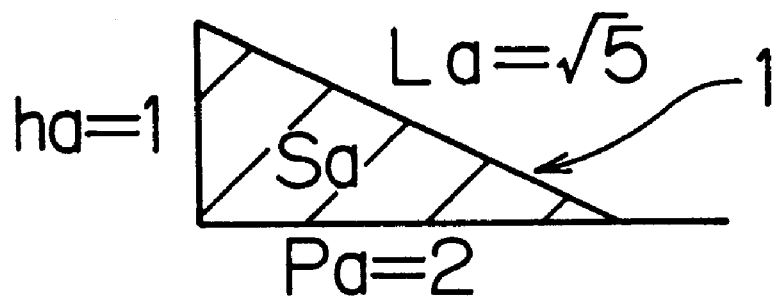
FIGS. 7A and 7B are diagrams showing model patterns for explaining a fill factor, with FIG. 7A showing a model having a coarser grating pitch, and FIG. 7B showing a model having a finer grating pitch.
Figure 7B:
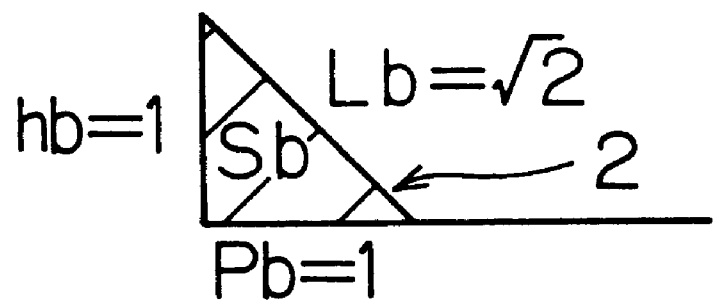

Here, two blaze-shaped diffraction gratings 1 and 2, respectively shown in FIG. 7A and FIG. 7B, will be considered. Suppose that these diffraction gratings 1 and 2 have grating heights such that ha=hb=1 (where ha and hb represent the grating height in the first and second diffraction gratings 1 and 2, respectively), and have grating pitches such that Pa=2 and Pb=1 (where Pa and Pb represent the grating pitch in the first and second diffraction gratings 1 and 2, respectively).

In these models, the first and second diffraction gratings 1 and 2 are brought into contact with the mold along the hypotenuse whose length is La=√5 and Lb=√2, respectively (where La and Lb represent the length of the hypotenuse in the first and second diffraction gratings 1 and 2, respectively). Hence, as shown in Table 7, the sum of the hypotenuse and the height is La+ha=$\sqrt{5}$+1 and Lb+hb=$\sqrt{2}$+1, respectively. On the other hand, the cross-sectional area is Sa=1 and Sb=0.5, respectively (where Sa and Sb represent the cross-sectional area in the first and second diffraction gratings 1 and 2, respectively).

Thus, the ratio of the sum of the lengths of the two sides to the cross-sectional area is 3.236 for the first diffraction grating 1 and 4.828 for the second diffraction grating 2. From this, it is clear that, as the grating pitch becomes finer, the surface area over which the diffraction grating is brought into contact with the mold becomes greater, and it is expected that, as a result, the transfer error becomes greater.

Also in practice, it is known that the contact surface area increases in proportion to the reciprocal of the grating pitch. For example, in a diffraction grating that produces spherical waves, the grating pitch is inversely proportional to the radius of the lens as regarded as a diffractive optical element, and therefore the transfer error increases in proportion to the radius of the lens. This leads to an increased transfer error and thus a reduced fill factor in the peripheral region of the diffractive optical element around its optical axis.

Table 6 lists the fill factors achieved with particular grating pitches in actual production. Note that a fill factor of 100% indicates that exactly the same grating height has been obtained in the produced diffraction grating as in the mold.

Conversely, to obtain the desired grating height in the produced diffractive optical element, it is necessary to take the transfer error, i.e., the fill factor, into consideration in designing the grating height of the mold. For example, in the example shown in Table 6, to obtain the same grating height in the fine-pitched region where the grating pitch is 18 $\mu$m as in the coarse-pitched region where the grating pitch is 148 $\mu$m, the mold needs to be designed to have, in its 18 $\mu$m-pitched region, such a grating height that is so much greater than the theoretical height as to compensate for the difference in the fill factor. As a result of such consideration, the blaze shape of the mold needs to be designed to have smaller grating heights in its central region around the optical axis than in its peripheral region.

Thus, according to the present invention, a mold for resin-molding synthetic resin material into a diffractive optical element that has a diffraction grating with many blaze-shaped grooves and that acts as a lens is so formed as to have, in its molding surface, smaller grating heights in a region corresponding to the central region of the diffractive optical surface of the produced diffractive optical element around the optical axis than a corresponding peripheral region of the diffractive optical surface. This makes it possible to obtain a diffraction grating that has appropriate grating heights both in central and peripheral regions, such regions being with respect to and around its optical axis.

Moreover, actual production of various diffraction gratings as mentioned above proved that, in the above method of producing a mold, it is preferable to calculate the grating height required at a particular position based on a grating pitch at that position according to formula (3) below.

$$h \geq 1.05 - 0.05 \times P/P\max \quad (3)$$

where h represents the grating height relative to a maximum grating height when the latter is assumed to be 1;

P represents the grating pitch; and

Pmax represents the maximum grating pitch.

<Embodiment 5 (FIGS. 8 and 9)>

Figure 8:
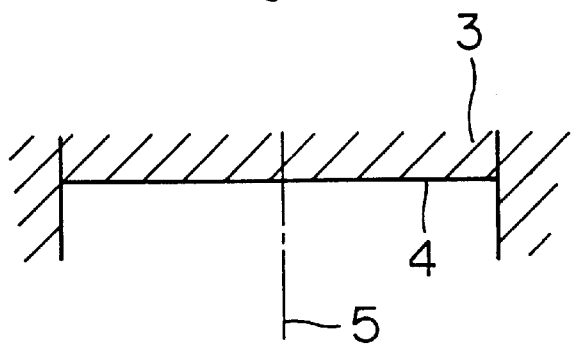
FIG. 8 is a diagram schematically showing the sectional structure of a mold embodying the invention.

FIG. 8 schematically shows the sectional structure of a mold embodying the invention. This mold for molding a diffractive optical element is used to resin-mold synthetic resin material into a lens that serves as a diffractive optical element having a diffraction grating with many blaze-shaped grooves. The mold 3 shown in FIG. 8 is one of a pair of male and female molds, and has its inner end surface formed into a molding surface 4 for molding the diffractive optical surface of the lens.

Figure 9:
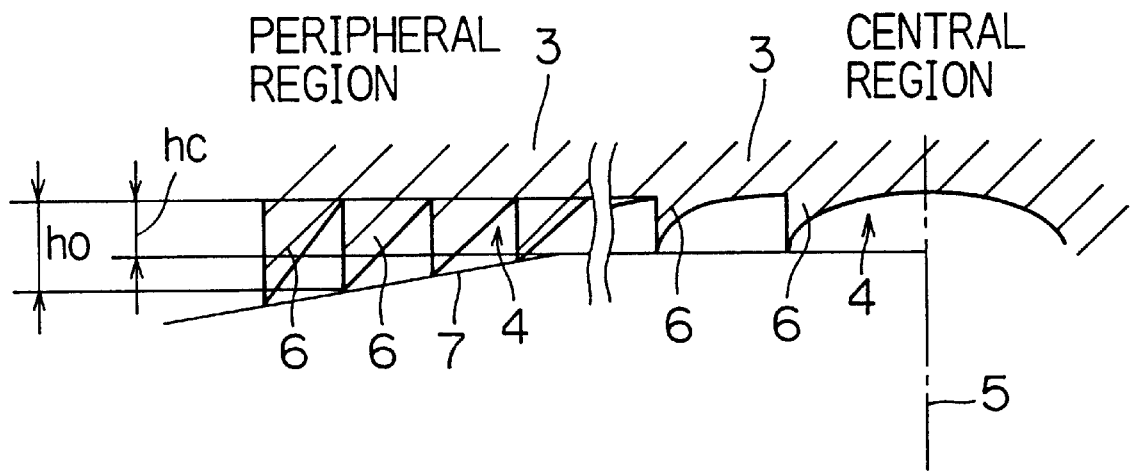
FIG. 9 is a diagram showing enlarged partial sections of the central and peripheral regions of the molding surface of the mold of the invention.

FIG. 9 shows the enlarged partial sections of the molding surface 4 in regions corresponding to the central and peripheral regions around the optical axis 5 of the diffractive optical surface of the lens formed by the mold 3. As shown in FIG. 9, in this embodiment, since the lens needs to have stronger power in its peripheral region than in its central region near the optical axis, the mold 3 has increasingly fine pitches toward its peripheral region, and is so designed that the height hc of the grating 6 in the central region of the molding surface 4 is accordingly smaller than the grating height ho at a particular position in the peripheral region.

In this case, the grating height at a particular position in the peripheral region is calculated according to formula (3) above, i.e., based on the ratio of the grating pitch at that position to the maximum grating pitch. Thus, in this embodiment, the blaze-shaped diffraction grating 6 has increasingly large grating heights toward its peripheral region. The line 7 is a line through the apexes of the grating 6, and thus indicates the variation of the grating height of the mold. As this line 7 indicates, the diffraction grating 6 has continuously increasing grating heights toward its peripheral region.

As described previously, the fill factor with which a pattern formed on the surface of the mold is transferred onto the resin material increases in proportion to the ratio of the surface area over which the resin is brought into contact with the mold 3 to the volume of the resin, and therefore, in this embodiment, to obtain the desired grating height in the produced diffractive optical element, i.e., to obtain the same grating height both in the peripheral region where the grating pitch is fine and in the central region where the grating pitch is coarse, the grating height is made so much greater in the peripheral region as to compensate for the difference in the fill factor between the peripheral and central regions. By forming the molding surface 4 of the mold 3 in this way, it is possible to obtain a lens that has appropriate grating heights both in its central and peripheral regions around the optical axis.

<Embodiment 6 (FIG. 10)>

Figure 10:
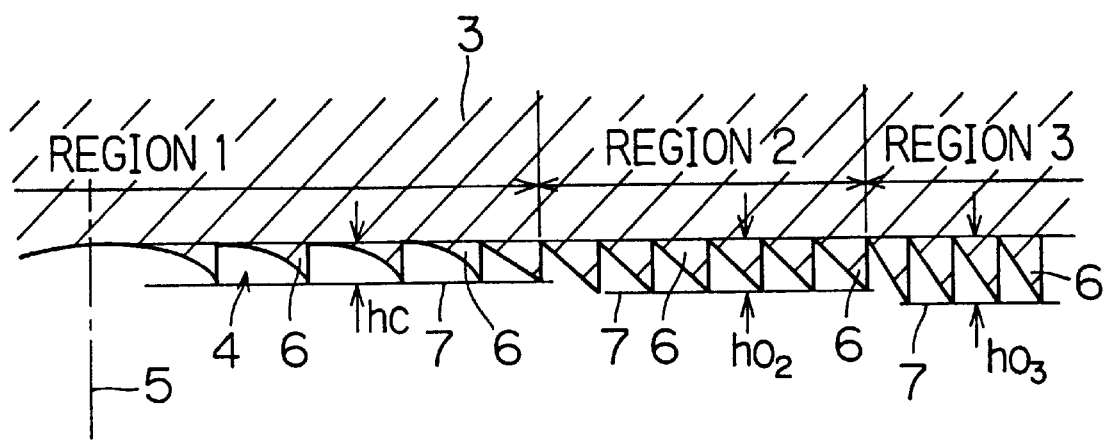
FIG. 10 is a diagram showing a partial section of the molding surface of another mold embodying the invention.

FIG. 10 shows another mold embodying the invention. In contrast to the previous embodiment, where the diffraction grating 6 is designed to have continuously increasing grating heights toward its peripheral region, in this embodiment, where the central region is labeled as region 1 and the peripheral region is subdivided into a plurality of regions that are labeled as region 2, 3, . . . , respectively, the diffraction grating 6 of the mold 3 is designed to have constant grating heights within each of those regions. In this case, the grating height hc in region 1, i.e., the central region, is the lowest, the grating height $ho_2$ in region 2 is the second lowest, the grating height $ho_3$ in region 3 is the third lowest, and so forth.

<Embodiment 7 (FIG. 11)>

Figure 11:
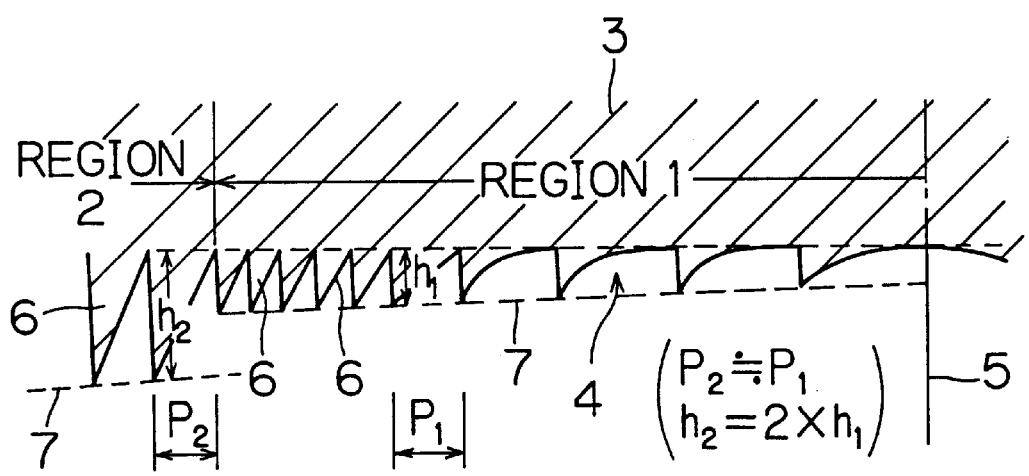
FIG. 11 is a diagram showing a partial section of the molding surface of still another mold embodying the invention.

FIG. 11 shows still another mold embodying the invention. In this embodiment, region 1, i.e., the central region, of the mold 3 is produced with design order of 1, and region 2, i.e., the peripheral region, is produced with the design order of 2. In other words, the grating height h2 at the innermost position in region 2, which has a grating pitch of $P_2$, is approximately twice the grating height h1 in region 1, which has a similar grating pitch $P_1$.

In addition, both within regions 1 and 2, the grating pitch is designed to decrease toward the peripheral side, and the grating height is so calculated according to formula (3) above as to reflect the grating pitch at given positions. Thus, as indicated by the line 7 that indicates the variation of the grating height of the mold, the grating height is designed to increase toward the peripheral region both in regions 1 and 2.

TABLE 1

<Diffraction Efficiency>

| Grating Height Ratio | Incident Angle θ | | |
|---|---|---|---|
| | 0° | 10° | 20° |
| 1 | 1 | 0.996 | 0.950 |
| 0.95 | 0.992 | 0.999 | 0.980 |
| 0.90 | 0.967 | 0.985 | 0.998 |

TABLE 2

<Construction Data of Embodiment 1>

| Surface | Radius of Curvature | Axial Distance | Refractive Index | Abbe Number |
|---|---|---|---|---|
| S1 | 15.033 | | | |
| | | 2.4 | 1.49329 | 59.93 |
| S2 [ASP, DOE] | −49.726 | | | |
| | | 0.56 | 1 | |
| S3 | −35.206 | | | |
| | | 1 | 1.49329 | 59.93 |
| S4 [ASP] | 6.467 | | | |
| | | 5.424 | 1 | |
| Aperture Diaphragm (E0) | ∞ | | | |
| | | 1.376 | 1 | |
| S5 | −5.551 | | | |
| | | 1 | 1.58752 | 30.23 |
| S6 | −17.026 | | | |
| | | 5.1 | 1 | |
| S7 [ASP] | 8.976 | | | |
| | | 3.4 | 1.49329 | 59.93 |
| S8 [ASP] | −6.252 | | | |
| | | 0.778 | 1 | |
| P1 | ∞ | | | |
| | | 15.5 | 1.5785 | 33 |
| P2 | −25.034 | | | |
| | | 3.15 | 1 | |
| Primary Image Plane (I) | ∞ | | | |
| | | 0 | 1 | |
| P3 | ∞ | | | |
| | | 26.125 | 1.58752 | 30.23 |
| P4 | ∞ | | | |
| | | 0.5 | 1 | |
| S9 | 21.005 | | | |
| | | 2 | 1.49329 | 59.93 |
| S10 [ASP] | −15.01 | | | |
| | | 13 | 1 | |
| Exit Pupil (E2) | ∞ | | | |

TABLE 3

<Aspherical & Diffractive Optical Surfaces in Embodiment 1>

| Aspherical Surface Data | | | Diffractive Optical Surface Data | | |
|---|---|---|---|---|---|
| Surface | ε | Ai (i > 3) | Surface | C1 | Ci (i > 1) |
| S2 | −18.968 | 0 | S2 | −0.0020 | 0 |
| S4 | −0.0654 | 0 | | | |
| S7 | −4.063 | 0 | | | |
| S8 | −0.105 | 0 | | | |
| S10 | −2 | 0 | | | |

TABLE 4

<Construction Data of Embodiment 2>

| Surface | Radius of Curvature | Axial Distance | Refractive Index | Abbe Number |
|---|---|---|---|---|
| S1 [DOE] | 27.691 | | | |
| | | 2.4 | 1.49329 | 59.93 |
| S2 [ASP] | −35.437 | | | |
| | | 0.56 | 1 | |
| S3 | −35.206 | | | |
| | | 1 | 1.49329 | 59.93 |
| S4 [ASP] | 6.467 | | | |
| | | 5.424 | 1 | |
| Aperture Diaphragm (E0) | ∞ | | | |
| | | 1.376 | 1 | |
| S5 | −5.551 | | | |
| | | 1 | 1.58752 | 30.23 |
| S6 | −17.026 | | | |
| | | 5.1 | 1 | |
| S7 [ASP] | 8.976 | | | |
| | | 3.4 | 1.49329 | 59.93 |
| S8 [ASP] | −6.252 | | | |
| | | 0.778 | 1 | |
| P1 | ∞ | | | |
| | | 15.5 | 1.5785 | 33 |
| P2 | −25.034 | | | |
| | | 3.15 | 1 | |
| Primary Image Plane (I) | ∞ | | | |
| | | 0 | 1 | |
| P3 | ∞ | | | |
| | | 26.125 | 1.58752 | 30.23 |
| P4 | ∞ | | | |
| | | 0.5 | 1 | |
| S9 | 21.005 | | | |
| | | 2 | 1.49329 | 59.93 |
| S10 [ASP] | −15.01 | | | |
| | | 13 | 1 | |
| Exit Pupil (E2) | ∞ | | | |

TABLE 5

<Aspherical & Diffractive Optical Surfaces in Embodiment 2>

| Aspherical Surface Data | | | Diffractive Optical Surface Data | | |
|---|---|---|---|---|---|
| Surface | ε | Ai (i > 3) | Surface | C1 | Ci (i > 1) |
| S2 | −18.968 | 0 | S2 | −0.0075 | 0 |
| S4 | −0.0654 | 0 | | | |
| S7 | −4.063 | 0 | | | |
| S8 | −0.105 | 0 | | | |
| S10 | −2 | 0 | | | |

TABLE 6

| Grating Pitch (μm) | 148 | 18 |
|---|---|---|
| Fill Factor (%) | 95 | 90 |

TABLE 7

| | Model Shown in FIG. 7A | Model Shown in FIG. 7B |
|---|---|---|
| Sum of Lengths of Two Sides | $La + ha = \sqrt{5} + 1$ | $Lb + hb = \sqrt{2} + 1$ |
| Area | $Sa = 1$ | $Sb = \frac{1}{2}$ |
| Sum of Lengths of Two Sides/Area | $\sqrt{5} + 1 = 3.236\cdots$ | $(\sqrt{2} + 1) \times 2 = 4.828\cdots$ |

What is claimed is:

1. A diffractive optical element having a central region and a peripheral region, such regions being with respect to and around an optical axis of the optical element, the optical element comprising:

a diffractive optical surface provided with a blaze-shaped diffraction grating, said diffraction grating having smaller grating heights in the peripheral region than in the central region, wherein said diffractive optical element acts as a single focal length lens element as a result of light rays being deflected by light-diffracting action of said diffractive optical surface.

2. A diffractive optical element in accordance with claim 1, wherein said diffractive optical element is adapted for placement within an optical system at a position within the optical system that is relatively distant from an aperture diaphragm or from a position where principal rays intersect the optical axis.

3. A diffractive optical element in accordance with claim 1, wherein said diffractive optical surface is adapted to also refract light passing therethrough.

4. A diffractive optical element in accordance with in claim 1, wherein said diffractive optical surface exerts a light-refracting action equivalent to a light-refracting action of an aspherical surface.

5. A diffractive optical element comprising:

a diffractive optical surface provided with a blaze-shaped diffraction grating composed of light-passing surfaces that pass light rays and wall surfaces that do not act optically, said wall surfaces being formed to be, in a central region around an optical axis of said diffraction grating, substantially cylindrical and parallel with respect to the optical axis and, in a peripheral region around the optical axis of said diffraction grating, conical with respect to the optical axis, wherein said diffractive optical element acts as a lens as a result of light rays being deflected by light-diffracting action of said diffractive optical surface.

6. A diffractive optical element in accordance with claim 5, wherein said diffractive optical element is adapted for placement within an optical system at a position within the optical system that is relatively distant from an aperture diaphragm or from a position where principal rays intersect the optical axis.

7. A diffractive optical element in accordance with claim 5, wherein said diffractive optical surface has a power that makes exiting angles of the light rays greater than their incident angles, and wherein said diffractive optical element is adapted for placement within an optical system with the diffractive optical surface facing a light-entering end of the optical system.

8. A diffractive optical element in accordance with claim 5, wherein said diffractive optical surface has a power that makes exiting angles of the light rays smaller than their incident angles, and wherein said diffractive optical element is adapted for placement within an optical system with the diffractive optical surface facing a light-exiting end of the optical system.

9. An optical system comprising:

a diffractive optical element having a central region and a peripheral region, such regions being with respect to and around an optical axis of the diffractive optical element, and a diffractive optical surface provided with a blaze-shaped diffraction grating, said diffraction grating having smaller grating heights in the peripheral region than in the central region, and said diffractive optical element acts as a single focal length lens element as a result of light rays being deflected by a light-diffracting action of said diffractive optical surface.

10. An optical system in accordance with claim 9, wherein said optical system is a viewfinder optical system.

11. An optical system in accordance with claim 9, wherein said optical system is a real-image viewfinder optical system, and wherein said diffractive optical element is provided in an objective lens system.

12. An optical system comprising:

a diffractive optical element having a diffractive optical surface provided with a blaze-shaped diffraction grating composed of light-passing surfaces that pass light rays and wall surfaces that do not act optically, said wall surfaces being formed to be, in a central region of said diffraction grating around an optical axis, substantially cylindrical and parallel with respect to the optical axis and, in a peripheral region of said diffraction grating around the optical axis, conical with resdect to the optical axis, said diffractive optical element acting as a lens as a result of light rays being deflected by light-diffracting action of said diffractive optical surface.

13. An optical system in accordance with claim 12, wherein said optical system is a viewfinder optical system.

14. An optical system in accordance with claim 12, wherein said optical system is a real-image viewfinder optical system, and wherein said diffractive optical element is provided in an objective lens system.

15. A method of constructing an optical system to reduce chromatic aberration in the optical system, the method comprising the steps of:

providing a diffractive optical element having a central region and a peripheral region, such regions being with respect to and around an optical axis of the diffractive optical element, and a blaze-shaped diffraction grating, said diffraction grating having smaller grating heights in the peripheral region than in the central region; and placing said diffractive optical element at such a position within the optical system that is relatively distant from an aperture diaphragm or from a position where principal rays intersect the optical axis.

16. A method of constructing an optical system to reduce chromatic aberration in the optical system, the method comprising the steps of:

providing a diffractive optical element having a blaze-shaped diffraction grating composed of light-passing surfaces that pass light rays and wall surfaces that do not act optically, said wall surfaces being formed to be, in a central region of said diffraction grating around a optical axis, substantially cylindrical and parallel with respect to the optical axis and, in a peripheral region of said diffraction grating around the optical axis, conical with respect to the optical axis; and placing said diffractive optical element at such a position within the optical system that is relatively distant from an aperture diaphragm or from a position where principal rays intersect the optical axis.

17. A mold for molding a single focal length lens element, the mold comprising:

a molding surface having smaller grating heights in a region corresponding to a central region around an optical axis of a single focal length lens element formed using said mold than in a region corresponding to a peripheral region of such lens element.

18. A mold in accordance with claim 17, wherein a grating height required at a particular position is calculated based on a grating pitch at that position by the following formula:

$$h \geq 1.05 - 0.05 \times P/P\text{max}$$

where, h represents the grating height relative to a maximum grating height when the latter is assumed to be 1, P represents the grating pitch, and Pmax represents the maximum grating pitch.

19. A method of producing a single focal length lens element, the method comprising the steps of:

providing a mold whose molding surface has smaller grating heights in a region corresponding to a central region around an optical axis of a single focal length lens element formed using said mold than in a region corresponding to a peripheral region around the optical axis of the lens element; and transferring a pattern of the molding surface of said mold onto a material.

20. A method in accordance with claim 19, wherein the material is a synthetic-resin.

21. A diffractive optical element comprising a diffractive optical surface provided with a blaze-shaped diffraction grating composed of light-passing surfaces that pass light rays and wall surfaces that do not act optically, said wall surfaces being formed to be, in a central region around an optical axis of said diffraction grating, substantially cylindrical and parallel with respect to the optical axis and, in a peripheral region around the optical axis of said diffraction grating, conical with respect to the optical axis.

22. A diffractive optical element having a central region and at least one peripheral region, such regions being with respect to and around an optical axis of the optical element, the optical element comprising:

an optical surface provided with a diffraction grating, said diffraction grating having smaller grating heights in at least one peripheral region than in the central region around, wherein the diffraction grating of the at least one peripheral region is formed of a plurality of surfaces, and each surface of the plurality of surfaces and the optical axis are not parallel.

23. A diffractive optical element having a central region and a peripheral region, such regions being with respect to and around an optical axis of the optical element, the optical element comprising:

a diffractive optical surface provided with a blaze-shaped diffraction grating, said diffraction grating having (i) smaller grating heights in the peripheral region than in the central region and (ii) a uniform diffraction efficiency in the central and peripheral regions, wherein said diffractive optical element acts as a lens element as a result of light rays being deflected by light-diffracting action of said diffractive optical surface.

24. An optical system comprising:

a diffractive optical element having a central region and a peripheral region, such regions being with respect to and around an optical axis of the diffractive optical element, and a diffractive optical surface provided with a blaze-shaped diffraction grating, said diffraction grating having (i) smaller grating heights in the peripheral region than in the central region and (ii) a uniform diffraction efficiency in the central and peripheral regions, wherein said diffractive optical element acts as a lens element as a result of light rays being deflected by a light-diffracting action of said diffractive optical surface.

25. A mold for molding an optical element, the mold comprising:

a molding surface having smaller grating heights in a region corresponding to a central region around an optical axis of an optical element formed using said mold than in a region corresponding to a peripheral region of such optical element to produce an optical element with a uniform diffraction efficiency in the central and peripheral regions thereof.

26. A method of producing an optical element, the method comprising the steps of:

providing a mold whose molding surface has smaller grating heights in a region corresponding to a central region around an optical axis of an optical element formed using said mold than in a region corresponding to a peripheral region around the optical axis of the optical element to produce an optical element with a uniform diffraction efficiency in the central and peripheral regions thereof; and transferring a pattern of the molding surface of said mold onto a material.

* * * * *